May 15, 1934.                    H. B. MARVIN                    1,959,170
                          SOUND REPRODUCING APPARATUS
                             Filed May 29, 1929
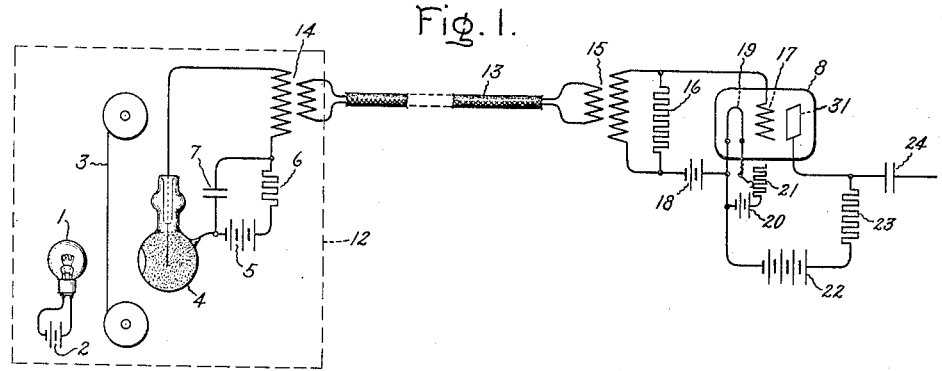
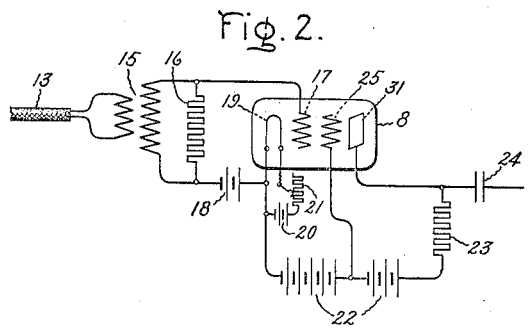
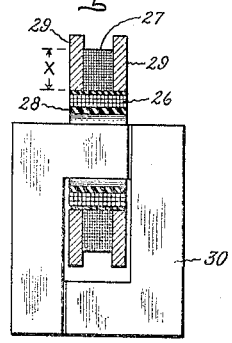
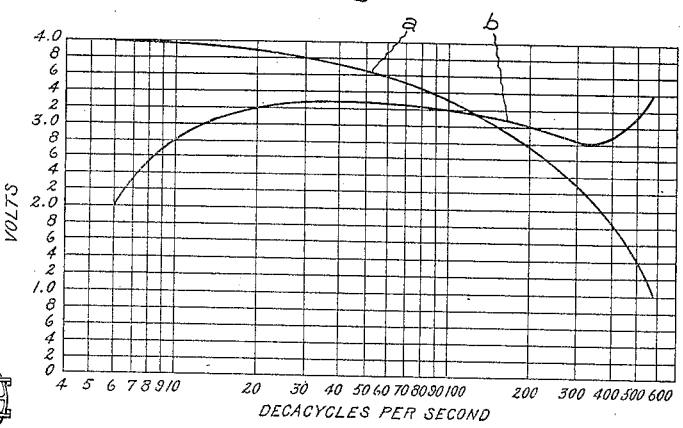
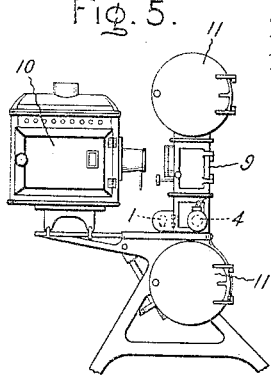
Inventor:
Harry B. Marvin,
by Charles E. Tullar
His Attorney.

Patented May 15, 1934

1,959,170

UNITED STATES PATENT OFFICE 1,959,170

SOUND REPRODUCING APPARATUS

Harry B. Marvin, Schenectady, N. Y., assignor to General Electric Company, a corporation of New York Application May 29, 1929, Serial No. 367,077

9 Claims. (Cl. 250—41.5)

The present invention relates to apparatus which combines the projection of light on a screen with the production of accompanying sounds, and more particularly to the sound reproducing portion of the apparatus.

In apparatus of the type mentioned, the beam of light, after being modulated in accordance with the variable transparencies of a moving picture film is projected onto the screen by means of a machine called a projector. The projector carries in addition to the light source and associated equipment auxiliary apparatus for translating impressions which accompany the picture images on the film into sound thereby to produce speech or music simultaneously with the picture. This auxiliary apparatus ordinarily constitutes a source of light normally directed upon a light-sensitive member, the sound impressions on the film being moved in a path between the light source and the said member. The light-sensitive member usualy comprises a photo-electric tube, the photo currents derived therefrom being amplified by a thermionic device in order to obtain energy sufficient to actuate the loud speaker. The amplifier heretofore has been mounted on the projector together with the lamp and photo-electric tube accessories in order to render the structure compact and rugged. However, in operation the projector which is constituted of many movable parts including gears, sprocket wheels, friction devices, etc. is in a state of continual vibration under operating conditions and it was observed that the vibratory motion was communicated to the amplifier and caused considerable distortion of the photo current and poor sound reproduction. Attempts to separate the amplifier and photo-electric tube to permit the mounting of the amplifier at a position remote from the projector and hence apart from the source of vibration has met heretofore with failure because of the necessity of providing a relatively long conducting cable between the photo-electric tube and amplifier with resulting loss in the cable of the minute unamplified photo-current by condenser effect. It will be understood that the photo-electric tube must inevitably be mounted on the projector in order efficiently to translate the light impressions on the film of the sound waves into undulations of current and hence it is not feasible to move the photo-electric tube away from the projector to form a combined unit with the remotely positioned amplifier.

One of the objects of my invention is to provide an improved arrangement which will enable positioning the amplifier away from the light-sensitive member, hence separate from the vibratory mechanism and at the same time will prevent the charging current loss in the cable connecting the amplifier and the light-sensitive device. Another object is to provide an improved connecting circuit between the photo-electric tube and the distant amplifier as will efficiently conduct the photo-currents of all the frequencies employed in sound reproduction. These and other objects are attained in brief by employing as a portion of the connecting circuit, a plurality of transformers one of which steps down the voltage at the entering end of the cable and the other of which steps up the voltage at the receiving end whereby the voltage in the cable remains relatively small and the current is increased in like proportion. These transformers are designed to give a substantially flat translation characteristic over the entire range of audio frequency utilized in the apparatus.

The invention will be more completely understood when reference is made to the following description and the accompanying drawing in which Fig. 1 shows a diagrammatic view of the electrical system forming part of the sound reproducing apparatus and improved in accordance with the principles of the invention; Fig. 2 represents a modification of the amplifier and associated circuits; Fig. 3 is a cross sectional view of one of the preferred types of transformers employed in the improved system; Fig. 4 is a graph showing the desired operating characteristics of the transformers, while Fig. 5 is a view in elevation of the complete projection apparatus broken away in portion and showing the relative positions of the projector, lamp and light-sensitive devices.

Referring to Fig. 1, numeral 1 designates a lamp which may be energized by a source of electromotive force 2. Light from the lamp is directed and focused in any suitable manner through a moving film 3 onto a light-sensitive member shown in the form of a photo-electric tube of well known construction. The film carries not only the picture images which are projected on the screen but also the sound impressions to accompany the picture. These impressions may be in the form of lines of variable length, different shades, colors or other kinds of indicia as will give rise to different degrees of activation of the photo-electric tube when subjected to light emitted by the lamp 1 and passed through the film thereby to cause articulated sound and music in the loud speaker (not shown). The photo-electric tube is energized preferably by a source of direct current 5 through a circuit including a protective resistance 6 and a by-pass condenser 7. This resistance serves to limit the current through the photo-electric tube in case the latter temporarily glows thereby to prevent damage. The photo-currents derived from the light-sensitive member are exceedingly small and it is necessary to provide some form of amplifying device in order to actuate the loud speaker. The amplifier, designated by the numeral 8 is preferably of the thermionic type inasmuch as its internal impedance approximates that of the photo-electric tube when activated and an amplifier of this character produces substantially no distortion.

Referring to Fig. 5, it is to be noted that the photo-electric tube 4 and lamp 1 are mounted directly on the projector 9 in order to constitute a unit complete in itself and also to facilitate the synchronization of the sound record with the movement of the picture images. The projector unit 9 which is shown without detail contains the necessary equipment for producing moving pictures; this equipment includes the projecting lamp 10, lenses, mechanism within the housings 11, 11 for winding and unwinding the film reels, also friction and accelerating devices to ensure the film moving past the projecting light 10 and cooperating lens at a predetermined velocity, all of which cause considerable vibration of the projector apparatus. The lamp 1 which cooperates with the photo-electric tube 4 is also mounted within the projector compartment; this compartment is indicated roughly in Fig. 1 by the dotted rectangle 12. It has been found in practice that when the amplifier is installed on the projector and notwithstanding the proficiency of the amplifier tube construction from a microphonic standpoint, there occurs electrical disturbances of an objectionable character in the output circuit of the amplifier. These disturbances are conveyed to the loud speaker and tend to cause disagreeable noises and other forms of acoustic distortion. On the other hand, when the amplifier is positioned remote from the photo-electric tube the extra length of cable causes an attenuation of the photo-currents flowing between the amplifier and the photo-electric devices which is usually greater for the higher frequencies than for the lower frequencies of the useful audible ranges.

In accordance with the principles of my invention, the amplifier is located at a position removed from the projector, at any convenient distance therefrom; this advantage is attained without undue current leakage loss in the extra length of cable. The improved cable 13 or the circuit connecting the photo-electric tube and the amplifier includes two voltage transformers 14, 15, one in the output circuit of the light-sensitive member 4 and the other in the input circuit of the amplifier 8. The amplifier may comprise a three-electrode device as shown in Fig. 1 or a four-electrode screen grid tube as exemplified in Fig. 2. Preferably, there is connected a resistance 16 across the secondary of the transformer 15 to constitute a definite load on the system. The grid 17 of the amplifier conveniently may be biased by a battery 18. The filament 19 of the amplifier is energized by a source of electromotive force 20 through a rheostat 21, while the output circuit includes a plate 31, battery 22 and a fixed resistance 23. The output circuit of the amplifier may be coupled to the input circuit of the succeeding stage through a blocking condenser 24 in the usual manner.

The transformers, a representative cross section of which is shown in Fig. 3, advantageously may be substantial duplicates except that transformer 14 is connected in such a manner as to step-down the voltage whereas transformer 15 steps the voltage up. As shown in Fig. 3, the inner winding contains a relatively few turns of an elongate shape to form a coil 26 of relatively long length when referred to the main axis of the solenoid and of small diameter. The outer winding has a larger number of turns and is formed into a coil 27 of relatively short length and of large diameter. The transformer coils may be wound on a spool 28 of an insulating material and supported between plates or flanges 29 preferably of wood or fiber. The relative number of turns in the respective windings or voltage transformation ratio is dependent upon the characteristics of the circuit including those of the tandem-connected photo-electric tube and amplifier and in general this ratio should be as large as possible consistent with good design because the greater the ratio, the smaller will be the voltage in the cable and the less the charging current leakage loss. A ratio of approximately 12:1 has given satisfactory results, the small and large coils having approximately 1500 and 18,000 turns respectively. The core 30 of the transformer conveniently may be fabricated out of double L-shaped laminations overlapped to form a closed member of substantially square cross section. The windings are arranged on one of the legs of the core producing a design which gives rise to considerable inductive leakage in order to improve the translation characteristics of the transformer over the operative frequency range as will be explained presently. It will be noted that the coil 27 assumes the general form of a pancake tipped on edge and that the distance X between the inner and outer layers is quite large thereby reducing the distributed capacity in the windings of this coil. It will further be observed that the inner winding 26 is spaced a considerable distance away from the core 30 in order to reduce capacity effect between the coil and the core or other conducting bodies attached to the core. This construction is desirable in order to reduce charging current loss. Moreover the low distributed capacity lends to the transformer as a whole such a high exciting impedance as will work efficiently in the output circuit of the high resistance photo-electric tube.

The improvement in operation brought about by the use of transformers in the manner specified is most clearly shown in Fig. 4 which depicts two curves $a$ and $b$ for comparison purposes. The curves are plotted against frequency as abscissa, the ordinate being expressed in voltage between the grid and filament of the amplifier. Curve $a$ which graphically represents the relation between voltage and frequency when transformers are not used, i. e. when simply a cable is employed between the photo-electric tube and amplifier, shows a decided falling off of the voltage as the frequency is raised indicating that considerable attenuation by capacity effect at the higher frequencies. Curve $b$ on the other hand illustrates the characteristic obtained when the transformers are employed in accordance with my invention. It will be noted that while there is a slight drop at the lower frequencies and a slight rise at the higher audio frequencies, on the whole the characteristic is flat indicating a uniform transfer throughout the desired frequency range of photo-current energy by the cable 13 to the input circuit of the amplifier. It is evident that the leakage reactance of the transformer may be designed to resonate with whatever capacity exists in the cable circuit to offset either the slight drop or rise of characteristic, thus introducing further flatness into the performance curve and increased efficiency of energy transfer. If desired, the resonance feature may also be utilized to offer a pronounced voltage response at the transformer terminals for a predetermined frequency or over a given frequency band.

In the case of the screen grid type of amplifier as illustrated in Fig. 2, an additional grid member 25 may be provided between the control grid and the plate 31, the screen grid being energized from a tap on the plate battery 22 as is well understood in the art. A device of this sort presents certain advantages over the three-electrode tube shown in Fig. 1 in that the load on the transformer is maintained more nearly independent of frequency and thereby the loss of voltage avoided at the higher frequencies. It is apparent that the voltage delivered across the resistor 16 depends on the total impedance connected to the transformer 15. Between the grid 17 and the filament 19 there is an impedance consisting largely of capacitance which comprises two parts (a) the usual electrostatic capacity between the electrodes 17 and 19 and (b) a parallel capacity between electrodes 17 and 31, which since the potential of electrode 31 varies mu times as much as that of electrodes 17, as much larger than (a). (mu is the effective voltage amplification of the tube). The grid 25 when maintained at constant potential eleminates the (b) effect mentioned and therefore makes the grid-filament impedance of the tube independent of amplification. For example, the effective input capacitance of the tube of Fig. 1 may be as high as 200 mmf., while that of Fig. 2 may be as low as 10 mmf.

It is apparent that I have disclosed an improved arrangement for conveying efficiently the current produced in the photo-electric tube, and which undulates in accordance with the sound impressions on the moving film, to the amplifier unit. The gain in efficiency may be attributed to the fact that variations in magnitude of the photo-current are first translated by the transformer 14 into corresponding changes of current at lower voltage which after traversing the cable 13 are retranslated by the cascade-arranged transformer 15 into variations at a higher voltage level suitable for charging the control grid 17 of the amplifier 8. Lowering the voltage level of the current undulations as they traverse the cable increases the current amplitude in corresponding degree and decreases the current leakage by capacity effect between the cable conductors. The direct benefit of being able efficiently to transmit the photo-currents through the cable is the fact that it is now possible to separate the photo-electric tube and amplifier unit and to mount the latter apart from the vibratory projecting apparatus. Indeed, it is practical as a result of my invention to locate the amplifier at any reasonable distance from the photo-electric device at a position dictated solely by convenience.

While I have shown my invention in its preferred form, it will be obvious to those skilled in the art that it is susceptible of various minor changes and modifications without departing from my invention and I therefore aim in the appended claims to cover such changes and modifications as fall within the true spirit and scope of my invention.

What I claim as new and desire to secure by Letters Patent of the United States, is:—

1. In combination, a light-sensitive device, a support therefor subject to vibration, an amplifier electrically connected to said device and located remote therefrom whereby the amplifier is isolated from the vibrations of said support, said electrical connection comprising a plurality of conductors combined in a cable and means for minimizing the capacity leakage effects in the adjacent conductors of said cable, said means comprising a plurality of cascade-arranged transformers.

2. In combination, a light-sensitive device, a support therefor subject to vibration, an amplifier electrically connected to said device and located remote therefrom whereby the amplifier is isolated from the vibrations of said support, said electrical connection comprising a plurality of conductors combined in a cable, and means for minimizing the capacity leakage effects in the adjacent conductors of said cable, said means comprising a voltage step-down transformer in the output circuit of the light-sensitive device and a voltage step-up transformer in the input circuit of the amplifier.

3. In combination, a light-sensitive device, a support therefor subject to vibration, an amplifier electrically connected to said device and located remote therefrom whereby the amplifier is isolated from the vibrations of said support, said electrical connection comprising a plurality of conductors combined in a cable, means for minimizing the capacity leakage effects in the adjacent conductors of the cable, said means comprising a plurality of cascade-arranged transformers each wound in such a manner that the average distance between the coils is sufficiently large to preclude appreciable capacity interaction.

4. In combination, a photo-electric tube, a support therefor subject to vibration, an amplifier electrically connected to said device and located remote therefrom whereby the amplifier is isolated from the vibrations of said support, said electrical connection comprising a plurality of conductors combined in a cable, means for minimizing the capacity leakage effects in the adjacent conductors of the cable, said means comprising a voltage step-down transformer in the output circuit of the photo-electric tube and a voltage step-up transformer in the input circuit of the amplifier whereby capacity leakage effects in the capacity circuit are minimized, said transformers having a relatively high leakage inductance which is arranged to resonate with the capacity of the circuit at certain frequencies transmitted through the connecting circuit whereby the efficiency of transmission of those frequencies is enhanced.

5. A system for reproducing sounds from phonograms comprising a light-sensitive cell adapted to be illuminated by light passing through the phonogram, a source of current, a step-down transformer, a current circuit including in series the primary winding of the step-down transformer, the current source and the said cell; a step-up transformer, located at a relatively great distance from the step-down transformer, suitably long conductors by way of which the primary winding of the step-up transformer is connected across the secondary winding of the step-down transformer and a thermionic tube having a grid circuit in which the secondary winding of the step-up transformer is inserted.

6. The combination of a light-sensitive cell, an amplifying tube, a low frequency coupling means connecting the said cell and tube, said coupling means comprising a step-down transformer the primary of which is connected to the light-sensitive cell, a step-up transformer the secondary of which is connected to the input side of the amplifying tube, an untuned circuit connecting the secondary of the step-down transformer in series with the primary of the step-up transformer, and a resistance connected in series with the primary of the step-down transformer.

7. In combination, means for producing light variations, a photo-electric device arranged to receive said variations, a grid controlled electron discharge amplifier for amplifying said variations, a cable connecting the photo-electric device and the grid circuit of the amplifier subject to capacitance losses at the frequencies produced by said means, a step-down transformer connected between the photo-electric device and one end of the cable and a step-up transformer connected between the other end of the cable and the grid circuit of the amplifier.

8. In sound reproducing apparatus, the combination of a light source, a photo-electric device, a sound record arranged to control the light reaching said device from said source, an electron discharge amplifier, a cable connecting the photo-electric device with the amplifier subject to capacitance losses at sound frequencies and means for reducing said capacitance losses comprising a step-down transformer between the photo-electric device and one end of the cable and a step-up transformer between the other end of the cable and said amplifier.

9. In sound reproducing apparatus, the combination of a light source, a photo-electric device, a sound record arranged to control the light reaching said device from said source, an electron discharge amplifier, a cable connecting the photo-electric device with the amplifier subject to capacitance losses at sound frequencies and means for increasing the efficiency of transmission of the sound frequencies comprising a step-down transformer between the photo-electric device and one end of the cable and a step-up transformer between the other end of the cable and said amplifier, said transformers being constructed to have relatively high leakage inductance which will resonate with the cable capacitance.

HARRY B. MARVIN.